(12) United States Patent
Egashira

(10) Patent No.: US 11,440,374 B2
(45) Date of Patent: Sep. 13, 2022

(54) AIR OUTLET DEVICE FOR AIR CONDITIONER

(71) Applicant: MORIROKU TECHNOLOGY COMPANY, LTD., Tokyo (JP)

(72) Inventor: Nobuya Egashira, Tokyo (JP)

(73) Assignee: MORIROKU TECHNOLOGY COMPANY, LTD., Tokyo (JP)

( * ) Notice: Subject to any disclaimer, the term of this patent is extended or adjusted under 35 U.S.C. 154(b) by 73 days.

(21) Appl. No.: 17/023,925

(22) Filed: Sep. 17, 2020

(65) Prior Publication Data
US 2021/0107333 A1  Apr. 15, 2021

(30) Foreign Application Priority Data
Oct. 15, 2019  (JP) .............................. JP2019-188859

(51) Int. Cl.
*B60H 1/34* (2006.01)
*B60H 1/00* (2006.01)

(52) U.S. Cl.
CPC ................................ *B60H 1/00871* (2013.01)

(58) Field of Classification Search
CPC .......................... B60H 1/00692; B60H 1/0065
USPC .......................................... 454/143, 152, 153
See application file for complete search history.

(56) References Cited

U.S. PATENT DOCUMENTS

| | | | |
|---|---|---|---|
| 6,435,962 B1 * | 8/2002 | Herron ................ | F24F 13/1413 454/290 |
| 2001/0029796 A1 * | 10/2001 | Magaribuchi ........... | F16H 19/04 74/89.17 |
| 2007/0093196 A1 * | 4/2007 | Morse ..................... | F16K 31/54 454/290 |
| 2009/0032758 A1 * | 2/2009 | Stevenson .......... | B60H 1/00692 251/248 |
| 2009/0241574 A1 * | 10/2009 | Ozeki ................ | B60H 1/00857 62/239 |
| 2015/0004897 A1 * | 1/2015 | Ishikawa .............. | B60H 1/3421 454/155 |
| 2016/0348934 A1 * | 12/2016 | Bailey ..................... | F24F 13/30 |
| 2020/0001679 A1 * | 1/2020 | Akiyama ............. | B60H 1/0005 |

FOREIGN PATENT DOCUMENTS

| | | |
|---|---|---|
| JP | 61-156838 U | 9/1986 |
| JP | 10-278544 A | 10/1998 |
| JP | 3149585 | 3/2009 |

OTHER PUBLICATIONS

Japanese Office Action (Notice of Reasons for Refusal) dated Aug. 31, 2021 with English translation, 9 pages.

* cited by examiner

*Primary Examiner* — Ko-Wei Lin
(74) *Attorney, Agent, or Firm* — Rankin, Hill & Clark LLP

(57) ABSTRACT

An air outlet device for an air conditioner includes a housing that also serves as an air outlet, swingable fins supported by the housing, a pinion gear portion that can swing with the fins, a rack gear portion that meshes with the pinion gear portion, and an operation portion that can linearly move with the rack gear portion. When the fins are swinging to a maximum swingable angle, a rack tooth portion of the rack gear portion, which meshes with the pinion gear portion, is a rack large tooth portion that is formed larger than the adjacent rack tooth portions.

3 Claims, 5 Drawing Sheets

AIR OUTLET DEVICE FOR AIR CONDITIONER

FIELD OF THE INVENTION

The present invention relates to an air outlet device for an air conditioner, which can change an air blowing direction (wind direction) by swingable fins.

BACKGROUND OF THE INVENTION

For example, in front of a person (or persons) in a passenger vehicle, provided is an air outlet device for an air conditioner capable of air blowing toward the person(s). As one of the air outlet devices for the air conditioners, there is known an air outlet device that has a swingable fin (or fins) for adjusting the air blowing direction (wind direction). The person in the vehicle can make a flow of air in any direction by adjusting the orientation of the fins. There is a technique disclosed in Japanese Utility Model Registration No. 3149585 (JP3149585U) as a prior art relating to the above-described air outlet device for the air conditioner.

The air outlet device of the air conditioner disclosed in Japanese Utility Model Registration No. 3149585 (JP3149585U) includes a housing serving as an air outlet, fins capable of closing the air outlet, a pinion gear portion that can swing with the fins, a rack gear portion meshing with the pinion gear portion, and an operation unit (KNOB) that can be operated by an operator.

As the operator causes the operation unit to slide to the left and right, the rack gear portion also slides to the left and right. As the rack gear portion slides, the pinion gear portion meshing with the rack gear portion swings in the lateral direction (to the left and right). The fins swing to the left and right with the pinion gear portion.

SUMMARY OF THE INVENTION

Problems to be Solved by the Invention

The inventors of this patent application have conducted research on air outlet devices for air-conditioners, and found that there was a possibility that an end of the rack gear portion was disengaged from the pinion gear portion upon sliding the operation unit vigorously. If the rack gear portion is disengaged from the pinion gear portion, it becomes impossible to displace (shift) the operation portion from that position.

An object of the present invention is to provide an air outlet device for an air conditioner which can be reliably operated.

Solution to the Problems

According to an aspect of the present invention, there is provided an air outlet device for an air conditioner, the device including:

a housing which is exposed to a room interior and serves as an air outlet;

at least one fin swingably supported by the housing, and capable of adjusting a direction of air blowing;

a pinion gear portion which can swing with the fin(s), the pinion gear portion being a substantially arcuate gear;

a rack gear portion which is a linear gear and meshes with the pinion gear portion; and an operation unit which can linearly move with the rack gear portion, a tooth portion of the rack gear portion, which meshes with the pinion gear portion when the fin(s) swings (swing) to a maximum swingable angle, being a rack large tooth portion which is formed larger than adjacent tooth portions, or a tooth portion of the pinion gear portion, which meshes with the rack gear portion when the fin(s) swings (swing) to the maximum swingable angle, being a pinion large tooth portion which is formed larger than adjacent tooth portions.

Advantageous Effects of the Invention

In the present invention, in a state where the fin(s) has (have) reached the maximum swingable angle, the rack tooth portion meshing with the pinion gear portion is the rack large tooth portion, or the pinion tooth portion meshing with the rack gear portion is the pinion large tooth portion. The rack large tooth portion and the pinion large tooth portion are larger than the adjacent tooth portions, respectively. The rack large tooth portion and the pinion large tooth portion require a large force to ride over than the remaining tooth portions. Therefore, when the operation portion is displaced vigorously to cause the fin(s) to reach the maximum swingable angle, it is difficult for the fin(s) to rotate beyond the maximum swingable angle. Thus, it is possible to reduce the possibility that the rack gear portion comes off the pinion gear portion. Consequently, it is possible to provide an air outlet device for an air conditioner which can be reliably operated.

DETAILED DESCRIPTION OF THE PREFERRED EMBODIMENTS

Figure 1:
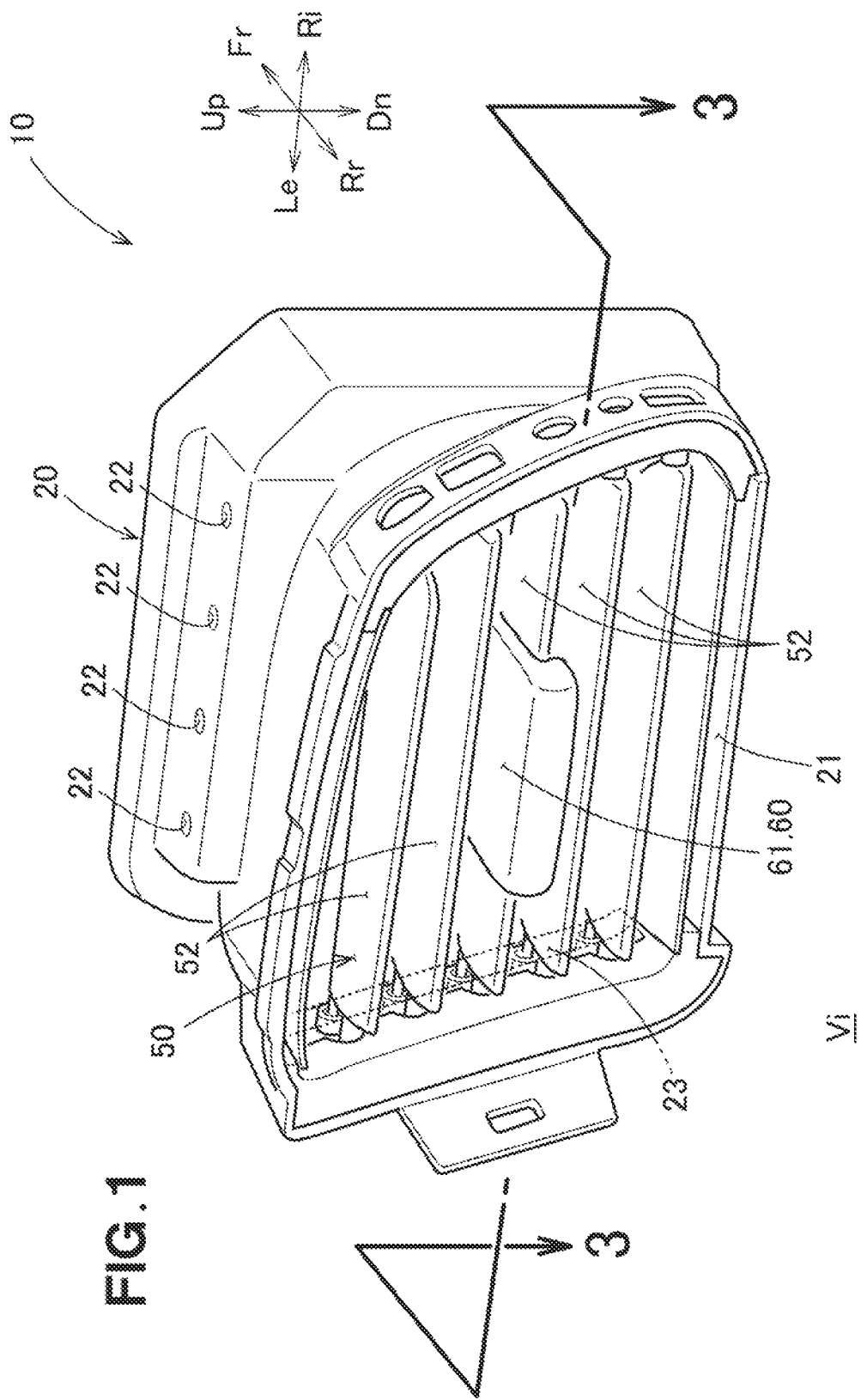
FIG. 1 is a perspective view of an air outlet device for an air conditioner according to an embodiment of the present invention.

Embodiments of the present invention will be described below with reference to the accompanying drawings. Incidentally, in the following description, the terms "left" and "right" refer to the left and right when viewed from a person in a vehicle, and the terms "front" and "rear" refer to the front and rear when viewed in the traveling direction of the vehicle. In addition, "Up" in the drawing presents the top or up, and "Dn" represents the bottom or down. The embodiments shown in the accompanying drawings are mere examples of the present invention, and the present invention is not limited to the embodiments.

EMBODIMENTS

Referring to FIG. 1, an air outlet device 10 for an air conditioner is fixed, for example, in a dashboard disposed in front of a person in a passenger vehicle. The person in the vehicle can adjust the air blowing direction to the horizontal (lateral) and vertical directions by displacing an operation unit 60 in the horizontal and vertical directions. Alternatively, as the person in the vehicle operates the operation unit 60, it is possible to shut off the air blowing into the vehicle interior (room interior) Vi.

Figure 2:
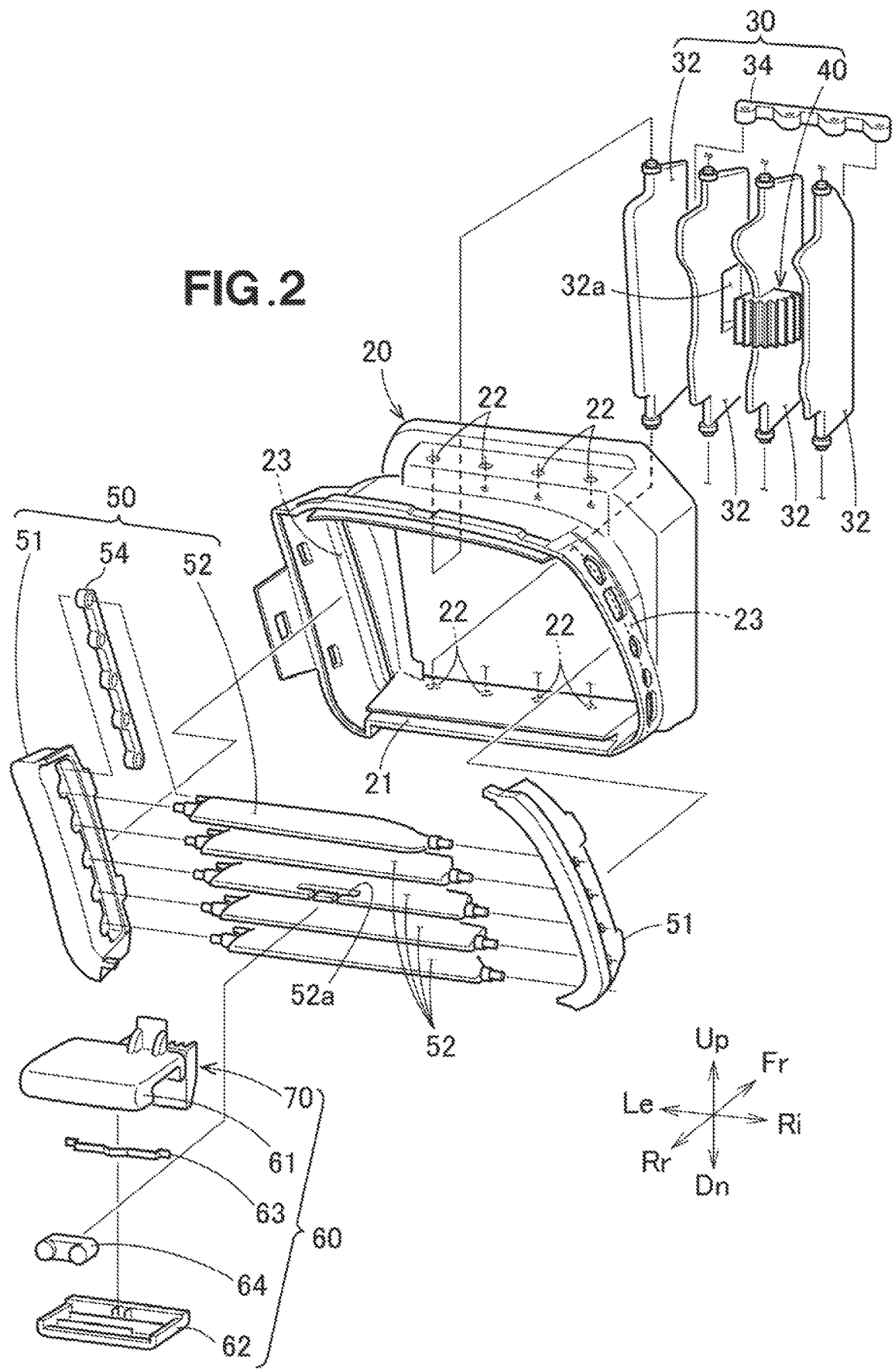
FIG. 2 is an exploded perspective view of the air outlet device shown in FIG. 1.

Referring to FIG. 2, the air conditioner's air outlet device 10 includes a housing 20 which also serves as an air outlet 21 formed in a frame shape, a vertical fin unit 30 which is supported by the housing 20 and extends vertically, a horizontal fin unit 50 which is supported by the housing 20 and extends horizontally, and an operation unit 60 which is supported by the horizontal fin unit 50 for causing the vertical fin unit 30 and the horizontal fin unit 50 to move.

The housing 20 has a substantially rectangular cylinder shape and is a member made from resin. A rear end of the housing 20 is exposed to the vehicle interior Vi (see FIG. 1). The rear end of the housing 20 also serves as an air outlet 21 for blowing the air into the vehicle interior Vi. The housing 20 includes vertical fin support portions 22 which are formed in top and bottom portions of the housing to support the vertical fin unit 30, and horizontal fin support portions 23 which are formed in left and right portions of the housing to support the horizontal fin unit 50.

The vertical fin unit 30 includes four vertical fins 32 supported by the vertical fin support portions 22 respectively such that the four vertical fins 32 can swing in the left and right directions, a pinion gear portion 40 which is integrally formed on one of the vertical fins 32 (second vertical fin 32 from the right in the drawing) such that the pinion gear portion 40 rotates upon shifting the operation portion 60 in the left and right directions, and a vertical fin link 34 which connects the four vertical fins 32 for causing the four vertical fins 32 to swing simultaneously in the left and right directions.

The horizontal fin unit 50 includes left and right fin support members 51, 51 which are fixed to the left and right fin support portions 23, 23, respectively, five horizontal fins 52 which are supported by the fin support members 51, 51 at opposite ends of the respective horizontal fins 52 such that the horizontal fins 52 can swing in the up and down directions, and a horizontal fin link 54 which connects the five horizontal fins 52 for causing the five horizontal fins 52 to swing simultaneously in the up and down directions.

Figure 3:
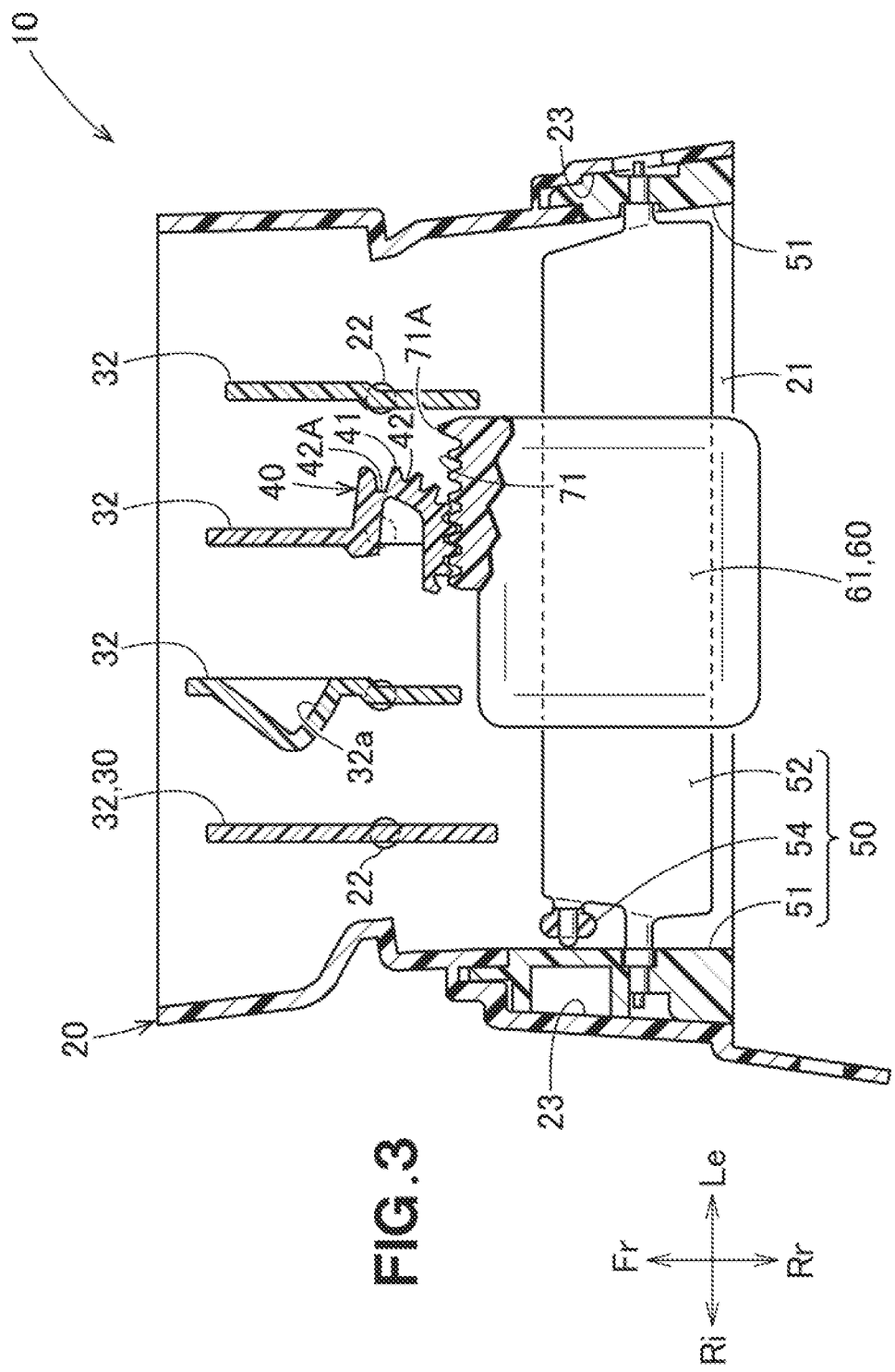
FIG. 3 is a cross-sectional view taken along the line 3-3 in FIG. 1.

Referring also to FIG. 3, the operation unit 60 is provided such that the operation unit 60 can slide in the left and right directions while sandwiching a fin groove 52a formed in a groove shape in one of the horizontal fins 52 (third horizontal fin 52 from the top in the drawing). The operation unit 60 includes an upper knob 61 provided along the upper surface of the horizontal fin 52, a lower knob 62 provided along the lower surface of the horizontal fin 52 such that the lower knob and the upper knob 61 sandwich the horizontal fin 52, a leaf spring 63 sandwiched by the upper knob 61 and the lower knob 62, a cap 64 held by the horizontal fin 52 such that the cap 64 abuts the lower knob 62, and a rack gear portion 70 which is integrally formed on the upper knob 61 and meshes with the pinion gear portion 40.

Figure 4A:
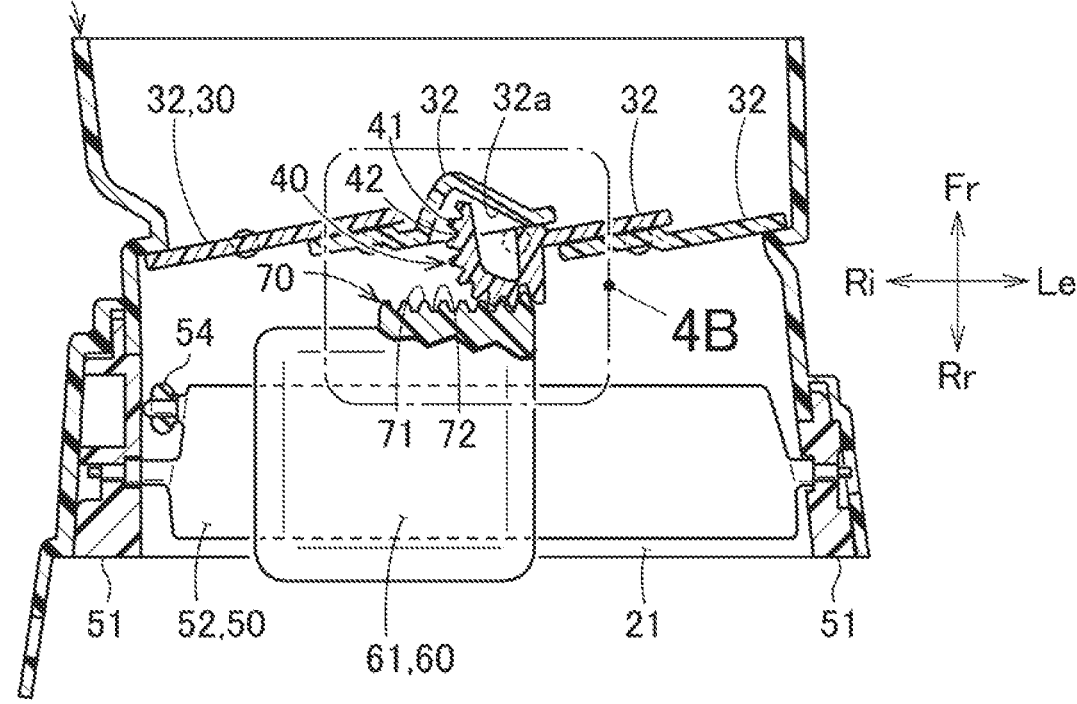
FIG. 4A is a cross-sectional view of the air outlet device when the fins are swinging to the maximum swingable angle.

Referring to FIG. 3 and FIG. 4A, as the operation unit 60 slides to the left and right, the pinion gear portion 40 meshing with the rack gear portion 70 rotates. As the pinion gear portion 40 rotates, the vertical fins 32 also swing in the left and right directions. The four vertical fins 32 are coupled to each other by the vertical fin link 34 (see FIG. 2), and therefore the four vertical fins 32 swing simultaneously as the vertical fin 32 having the pinion gear portion 40 formed thereon swings.

In the state shown in FIG. 3, the wind blows (the air flows) toward the rear. In the state shown in FIG. 4A, the outlet 21 is closed. Therefore, the wind does not blow into the vehicle interior Vi (see FIG. 1). The vertical fins 32 can swing up to the position shown in FIG. 4A. This state is referred to as a state in which the vertical fins 32 are swinging to the maximum angle of swinging or the maximum swingable angle.

It should be noted that the state where the vertical fins 32 are swinging to the maximum swingable angle (maximum swing angle) is not decided by the opening and closing of the air outlet 21, but by the position at which the swinging of the vertical fins 32 is stopped. It is preferred, however, that the maximum swing angle of the vertical fins 32 is set to an angle that allows the vertical fins 32 to close the air outlet 21. If the engagement between the pinion gear portion 40 and the rack gear portion 70 is disengaged, it becomes impossible to move the vertical fins 32. If it occurs, and the vertical fins 32 are in the closed state, then it is impossible to send the wind into the vehicle interior. On the other hand, if it becomes impossible to move the vertical fins 32 from the state where the vertical fins 32 are open, it is sufficient to stop the air blowing. Therefore, it is preferred that the maximum swing angle of the vertical fins 32 is set to an angle at which the vertical fins 32 close the air outlet 21.

Referring to FIG. 1, upon swinging the operation unit 60 up and down, the horizontal fin 52 supporting the operation unit 60 swings up and down. The five horizontal fins 52 are coupled to each other by the horizontal fin link 54 (see FIG. 2), and therefore the five horizontal fins 52 swing simultaneously as the horizontal fin 52 supporting the operation portion 60 swings.

Referring to FIG. 4A, the vertical fin 32 (i.e., the second vertical fin 32 from the left in the drawing) adjacent to the vertical fin 32 that has the pinion gear part 40 formed thereon has a pocket or a receiving portion 32a to receive a portion of the pinion gear portion 40 when the vertical fins 32 are swinging to the maximum swing angle. The receiving portion 32a is formed in a concave shape so as to escape from (or avoid) the pinion gear portion 40.

Figure 4B:
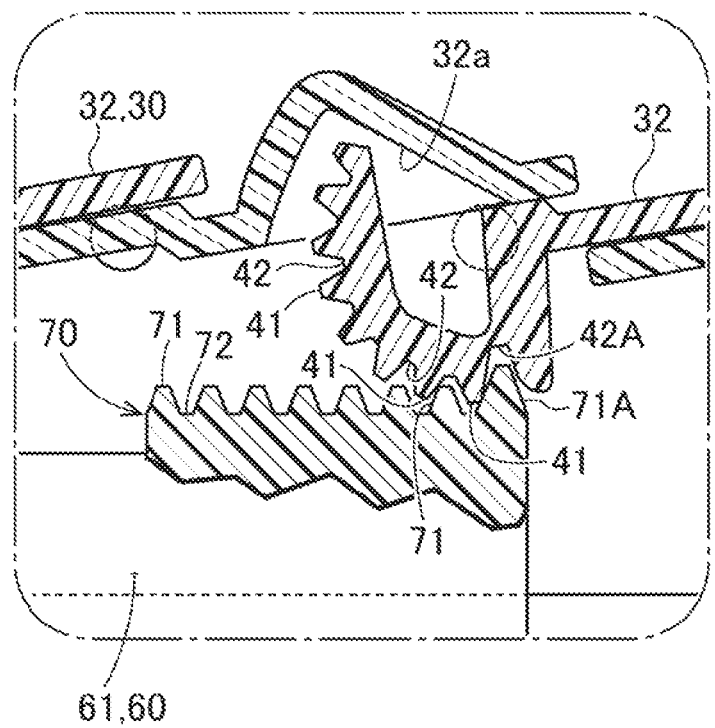
FIG. 4B is an enlarged view of a portion 4B in FIG. 4A.

Referring to FIG. 4B, the pinion gear portion 40 has a plurality of pinion tooth portions 41, which are teeth of the pinion gear formed at the same pitch. Between every two pinion tooth portions 41 and 41, defined is a pinion bottom 42. Of the pinion bottoms 42, the pinion bottom 42A that engages with the rack gear portion 70 when the vertical fins 32 are swinging to the maximum swing angle is a pinion large bottom 42A formed deeper than the adjacent pinion bottoms 42.

The rack gear portion 70 has a plurality of rack tooth portions 71, which are teeth of the rack gear formed at the same pitch. Between every two rack tooth portions 71 and 71, defined is a rack bottom 72. Of the rack tooth portions 71, the rack tooth portion 71A that faces the pinion large bottom 42A when the vertical fins are swinging to the maximum swing angle is a rack large tooth portion 71A formed higher than the adjacent rack tooth portions 71.

The shape of the pinion large bottom 42A conforms to the shape of the upper end (free end) of the rack large tooth portion 71A.

Figure 5A:
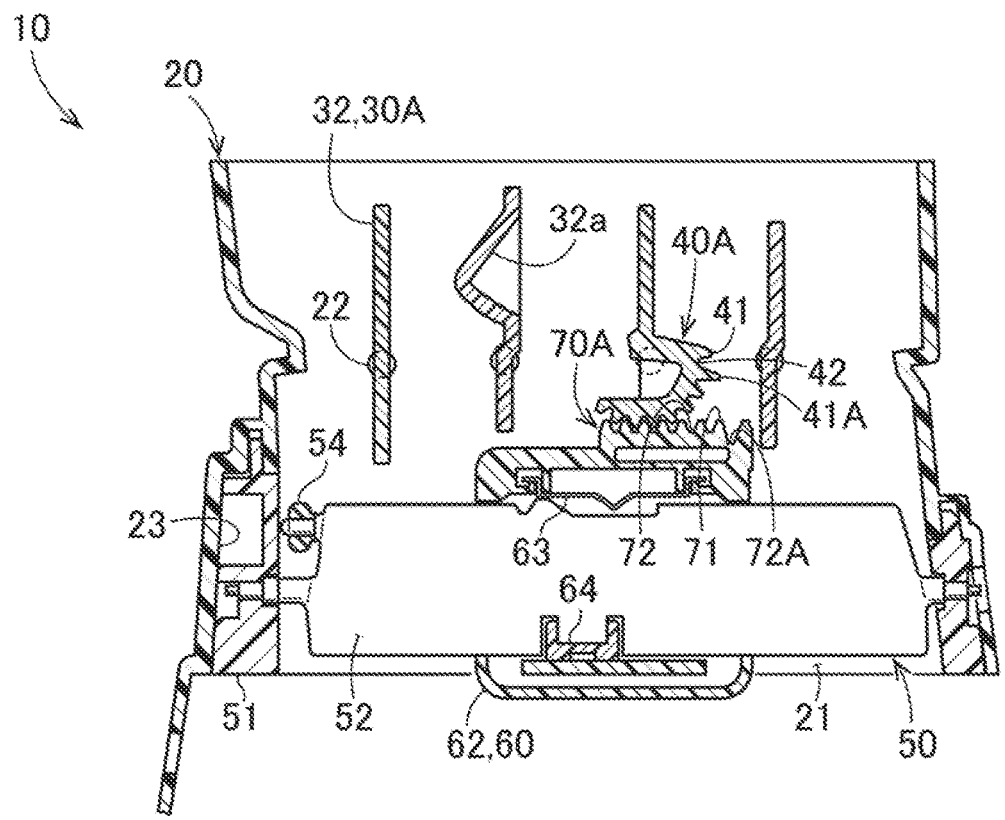
FIG. 5A is a cross-sectional view of an air outlet device for an air conditioner according to a modified embodiment.
Figure 5B:
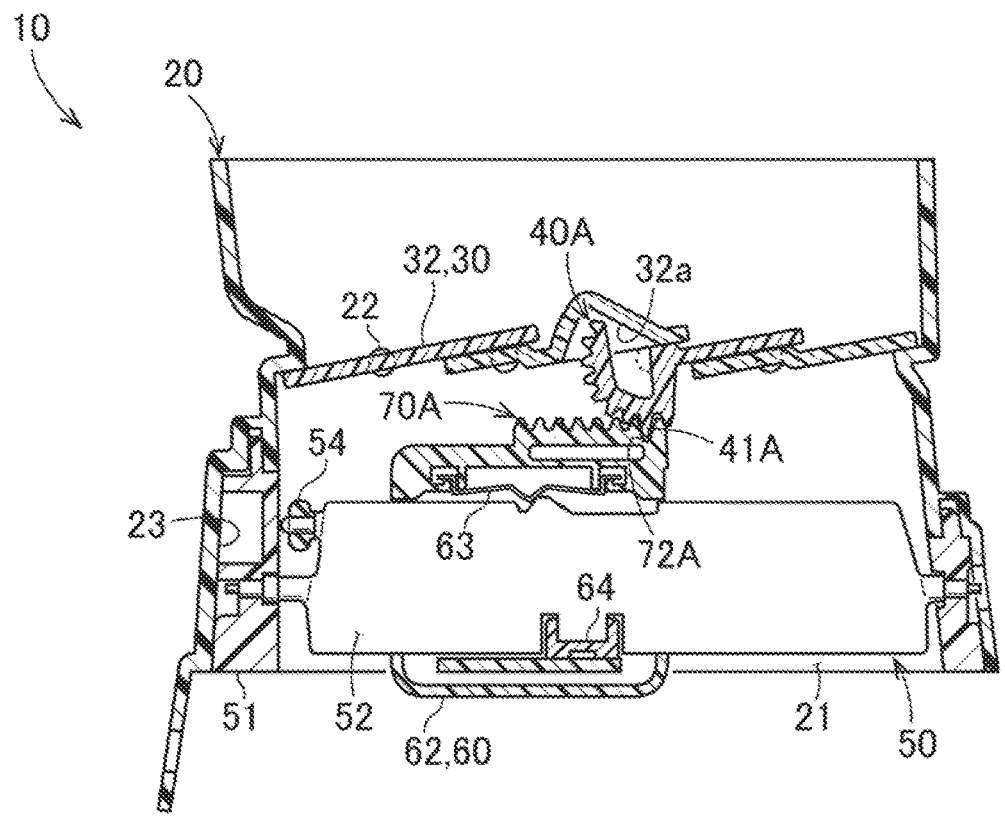
FIG. 5B is a cross-sectional view of the air outlet device for the air conditioner when the fins shown in FIG. 5A are swinging to the maximum swingable angle.

Referring to FIG. 5A and FIG. 5B, it should be noted that a pinion tooth portion 41A that meshes with the rack gear portion 70A when the vertical fins are swinging to the maximum swing angle may be formed larger. In this configuration, it can be said that the tooth portion 41A of the pinion gear portion 40A meshing with the rack gear portion 70A is a pinion large tooth portion 41A which is formed larger than the adjacent tooth portions 41.

Further, with this configuration, the rack gear portion 70A may have a rack large bottom 72A that faces the pinion large tooth portion 41A and is formed deeper than the adjacent rack bottoms 72. Also, the rack large bottom 72A may have a shape that conforms to the shape of the free end of the pinion large tooth portion 41A.

The advantageous effects of the above-described air conditioner's air outlet device 10 will be described.

Referring to FIG. 4B, the rack tooth portion meshing with the pinion gear portion 40 when the vertical fins 32 are swinging to the maximum swing angle is the rack large tooth portion 71A. The rack large tooth portion 71A is larger than the adjacent rack tooth portions 71. The rack large tooth portion 71A requires a larger force to ride over than the other rack tooth portions 71. Therefore, when the operation unit 60 is shifted vigorously (quickly) to cause the vertical fins 32 to move to the maximum swing angle, it is difficult for the vertical fins 32 to rotate beyond the maximum swing angle. Thus, it is possible to prevent the rack gear portion 70 from disengaging from the pinion gear portion 40 or reduce the possibility that the rack gear portion 70 disengages from the pinion gear portion 40. Consequently, it is possible to provide an air conditioner's air outlet device 10 which can be reliably operated. Incidentally, when the pinion gear portion 40 has the pinion large tooth portion 41A (see FIG. 5A), the same advantageous effect is achieved.

In addition, the pinion gear portion 40 has the pinion large bottom 42A that faces the free end of the rack large tooth portion 71A and is formed deeper than the adjacent pinion bottoms 42. The pinion large bottom 42A reduces the possibility that the free end of the rack large tooth portion 71A contacts the pinion gear portion 40, and reduces the possibility that a force acts in the direction to separate the pinion gear portion 40 from the rack gear portion 70. Thus, it is possible to further reduce the possibility that the rack gear portion 70 is disengaged from the pinion gear portion 40. The same applies to the configuration in which the rack gear portion 70A has the rack large bottom 72A.

In addition, the pinion large bottom 42A is shaped to conform to the rack large tooth portion 71A. Therefore, it is possible to reliably prevent the pinion large bottom 42A from contacting the free end of the rack large tooth portion 71A even when the rack large tooth portion 71A rotates. The same applies to the configuration in which the rack large bottom 72A has a shape to conform to the pinion large tooth portion 41A.

Further, at the time of assembling the vertical fin unit 30, the pinion large bottom 42A and the rack large tooth portion 71A may be engaged with each other and used as a guide (mark) for the assembling work. This facilitates the assembling work.

Incidentally, although the air conditioner's air outlet device according to the present invention is provided in the dashboard and described in the embodiment, the air conditioner's air outlet device according to the present invention is also applicable to other applications such as being provided on the ceiling portion or in the pillar of the vehicle. Furthermore, the present invention is applicable to other vehicles than the passenger vehicles and to construction machines and the like, i.e., the present invention is not limited to the above-mentioned applications.

In addition, although the air conditioner's air outlet device according to the embodiment of the present invention has the vertical fins and the horizontal fins, the present invention is also applicable to the air conditioner's air outlet device that has only one type of fins (the vertical fins or the horizontal fins). Furthermore, the present invention is applicable to the horizontal fins.

Further, the large tooth portion, which is larger than the adjacent tooth portions, can be formed at each of the opposite ends of the pinion gear portion or each of the opposite ends of the rack gear portion. In a similar configuration, one of the two large tooth portions may be formed on the pinion gear portion, and the other large tooth portion may be formed on the rack gear portion. Incidentally, if the large tooth portion is formed at one end, it is preferable that the large tooth portion is used when the fins close the air outlet.

As long as the advantageous effects of the present invention are achieved, the present invention is not limited to the embodiments.

What is claimed is:

1. An air outlet device for an air conditioner, the air outlet device comprising:
   a housing, which is exposed to a room interior and serves as an air outlet;
   at least one fin swingably supported by the housing, and capable of adjusting a direction of air blowing;
   a pinion gear portion that is configured to swing with the at least one fin, the pinion gear portion being a substantially arcuate gear;
   a rack gear portion, which is a linear gear and meshes with the pinion gear portion; and
   an operation unit that is configured to linearly move with the rack gear portion,
   a rack tooth portion of the rack gear portion, which meshes with the pinion gear portion when the at least one fin swings to a maximum swingable angle, the rack tooth portion being a rack large tooth portion that is formed larger than adjacent rack tooth portions of the rack gear portion, or
   a pinion tooth portion of the pinion gear portion, which meshes with the rack gear portion when the at least one fin swings to the maximum swingable angle, the pinion tooth portion being a pinion large tooth portion that is formed larger than adjacent pinion tooth portions of the pinion gear portion.

2. The air outlet device for the air conditioner according to claim 1, wherein the pinion gear portion has a pinion large bottom that faces a free end of the rack large tooth portion and is formed deeper than adjacent pinion bottoms of the pinion gear portion, or
   the rack gear portion has a rack large bottom that faces the pinion large tooth portion, and is formed deeper than adjacent rack bottoms of the rack gear portion.

3. The air outlet device for the air conditioner according to claim 2, wherein the pinion large bottom has a shape that conforms to the rack large tooth portion, or
   the rack large bottom has a shape that conforms to the pinion large tooth portion.

* * * * *